US012675511B2

(12) United States Patent 
Qian et al.

(10) Patent No.: US 12,675,511 B2 
(45) Date of Patent: Jul. 7, 2026

(54) RECOMMENDATION GENERATION WITH USER VALUES

(71) Applicant: Dell Products L.P., Round Rock, TX (US)

(72) Inventors: Ming Qian, Newton, MA (US); Corinne Schulze, Hopkinton, MA (US); Michael Barnes, Doylestown, PA (US); Ramesh Doddaiah, Westborough, MA (US); Sumanta Kashyapi, Worcester, MA (US); Frederic Meunier, Montreal (CA); Jean C. Metcalf, Raleigh, NC (US); Christopher J. Steinauer, Raleigh, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/917,766

(22) Filed: Oct. 16, 2024

(65) Prior Publication Data

US 2026/0105078 A1 Apr. 16, 2026

(51) Int. Cl.
| | |
|---|---|
| *G06F 16/3329* | (2025.01) |
| *G06F 16/31* | (2019.01) |
| *G06N 3/0475* | (2023.01) |

(52) U.S. Cl.
CPC ........ *G06F 16/3329* (2019.01); *G06F 16/316* (2019.01); *G06N 3/0475* (2023.01)

(58) Field of Classification Search
CPC ............................ G06F 16/3329; G06F 16/316
USPC ........................................................ 707/741
See application file for complete search history.

(56) References Cited

U.S. PATENT DOCUMENTS

| | | | | |
|---|---|---|---|---|
| 12,106,318 B1 * | 10/2024 | Chiang | ................ | G06Q 30/016 |
| 2025/0190693 A1 * | 6/2025 | Plotkin | ................... | G06F 40/30 |
| 2025/0259075 A1 * | 8/2025 | Crabtree | ................ | G06N 3/092 |
| 2025/0259144 A1 * | 8/2025 | Crabtree | ........... | G06Q 30/0601 |

(Continued)

OTHER PUBLICATIONS

Gadesha, et al. "What is prompt chaining?" IBM. Apr. 23, 2024. [https://www.ibm.com/think/topics/prompt-chaining#:~:text= Enhanced%20control,such%20as%20a%20research%20paper] retrieved May 29, 2025, 11 pages.

(Continued)

*Primary Examiner* — Kimberly L Wilson 
(74) *Attorney, Agent, or Firm* — Amin, Turocy & Watson, LLP

(57) ABSTRACT

A system can obtain a first prompt as output from inputting an alert about a computer system to a first retrieval-augmented generation system (RAG). The system can obtain a first answer as output from inputting the first prompt to a first large language model (LLM). The system can obtain a value maintained by an entity associated with the computing system as output from inputting the alert to a second RAG. The system can obtain a second answer as output from inputting the first answer, the value, and a second prompt to a second LLM, wherein the second LLM comprises the first LLM or another LLM different from the first LLM. The system can obtain a third answer as output from inputting the second answer, user information associated with the entity, and a third prompt to a third LLM. The system can make the third answer available to the entity.

20 Claims, 12 Drawing Sheets

(56)          References Cited

U.S. PATENT DOCUMENTS

| | | | | |
|---|---|---|---|---|
| 2025/0307563 | A1* | 10/2025 | Kumar | G06F 40/35 |
| 2025/0310383 | A1* | 10/2025 | Menon | H04L 63/205 |

OTHER PUBLICATIONS

Wu, et al. "AI Chains: Transparent and Controllable Human-AI Interaction by Chaining Large Language Model Prompts." Proceedings of the 2022 CHI Conference on Human Factors in Computing Systems [arXiv:2110.01691v3], Mar. 2022, 22 pages.

* cited by examiner

100

200

| VALUES 202 | DATA AND METRICS 204 |
|---|---|
| SECURITY | DATA ANOMALIES, UPDATES, CYBERSECURITY POLICY STATUS |
| SUSTAINABILITY | CO2e, POWER USAGE |
| RESOURCE EFFICIENCY | CO2e METRICS, POWER USAGE, PERFORMANCE LEVELS AS COMPARED TO CAPACITY |
| ROI | COST, POWER USAGE, RECLAIMABLE STORAGE |
| COST | POWER USAGE, RECLAIMABLE STORAGE, FOR SUBSCRIPTIONS: PRICE PER CAPACITY SIZE AND WHETHER CAPACITY IS BEING UTILIZED |
| CAPACITY | CAPACITY FORECAST, RECLAIMABLE STORAGE |

Figure 5:
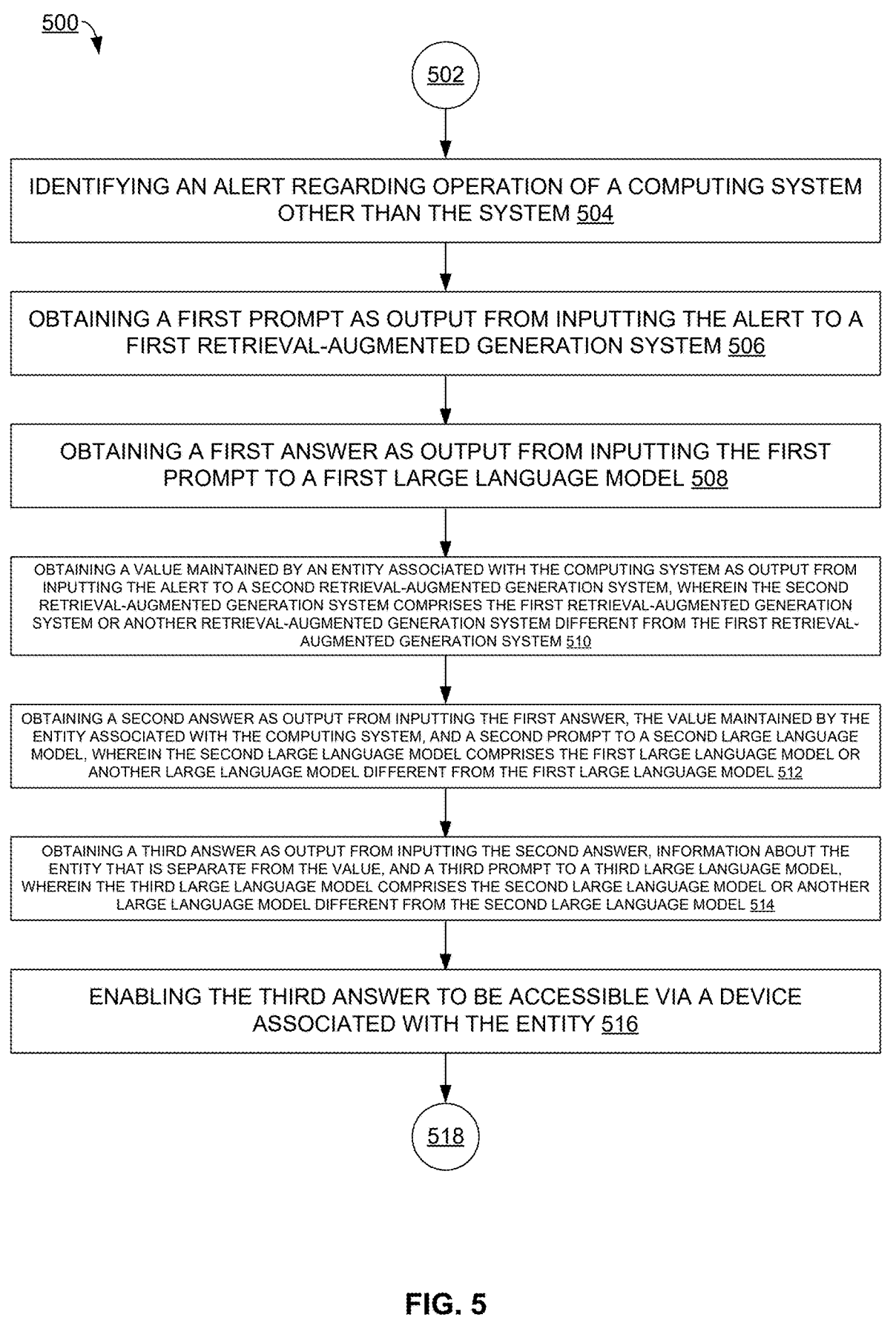

IDENTIFYING AN ALERT REGARDING OPERATION OF A COMPUTING SYSTEM OTHER THAN THE SYSTEM 504

OBTAINING A FIRST PROMPT AS OUTPUT FROM INPUTTING THE ALERT TO A FIRST RETRIEVAL-AUGMENTED GENERATION SYSTEM 506

OBTAINING A FIRST ANSWER AS OUTPUT FROM INPUTTING THE FIRST PROMPT TO A FIRST LARGE LANGUAGE MODEL 508

OBTAINING A VALUE MAINTAINED BY AN ENTITY ASSOCIATED WITH THE COMPUTING SYSTEM AS OUTPUT FROM INPUTTING THE ALERT TO A SECOND RETRIEVAL-AUGMENTED GENERATION SYSTEM, WHEREIN THE SECOND RETRIEVAL-AUGMENTED GENERATION SYSTEM COMPRISES THE FIRST RETRIEVAL-AUGMENTED GENERATION SYSTEM OR ANOTHER RETRIEVAL-AUGMENTED GENERATION SYSTEM DIFFERENT FROM THE FIRST RETRIEVAL-AUGMENTED GENERATION SYSTEM 510

OBTAINING A SECOND ANSWER AS OUTPUT FROM INPUTTING THE FIRST ANSWER, THE VALUE MAINTAINED BY THE ENTITY ASSOCIATED WITH THE COMPUTING SYSTEM, AND A SECOND PROMPT TO A SECOND LARGE LANGUAGE MODEL, WHEREIN THE SECOND LARGE LANGUAGE MODEL COMPRISES THE FIRST LARGE LANGUAGE MODEL OR ANOTHER LARGE LANGUAGE MODEL DIFFERENT FROM THE FIRST LARGE LANGUAGE MODEL 512

OBTAINING A THIRD ANSWER AS OUTPUT FROM INPUTTING THE SECOND ANSWER, INFORMATION ABOUT THE ENTITY THAT IS SEPARATE FROM THE VALUE, AND A THIRD PROMPT TO A THIRD LARGE LANGUAGE MODEL, WHEREIN THE THIRD LARGE LANGUAGE MODEL COMPRISES THE SECOND LARGE LANGUAGE MODEL OR ANOTHER LARGE LANGUAGE MODEL DIFFERENT FROM THE SECOND LARGE LANGUAGE MODEL 514

ENABLING THE THIRD ANSWER TO BE ACCESSIBLE VIA A DEVICE ASSOCIATED WITH THE ENTITY 516

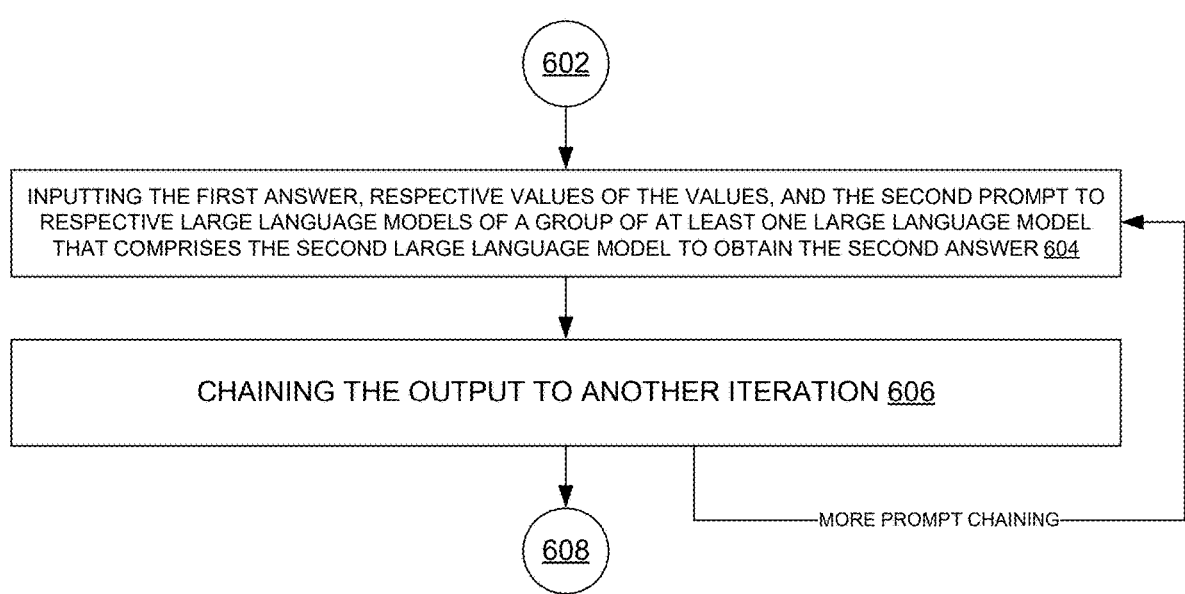
600
602
INPUTTING THE FIRST ANSWER, RESPECTIVE VALUES OF THE VALUES, AND THE SECOND PROMPT TO RESPECTIVE LARGE LANGUAGE MODELS OF A GROUP OF AT LEAST ONE LARGE LANGUAGE MODEL THAT COMPRISES THE SECOND LARGE LANGUAGE MODEL TO OBTAIN THE SECOND ANSWER 604
CHAINING THE OUTPUT TO ANOTHER ITERATION 606
608
—MORE PROMPT CHAINING—
FIG. 6

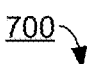
700
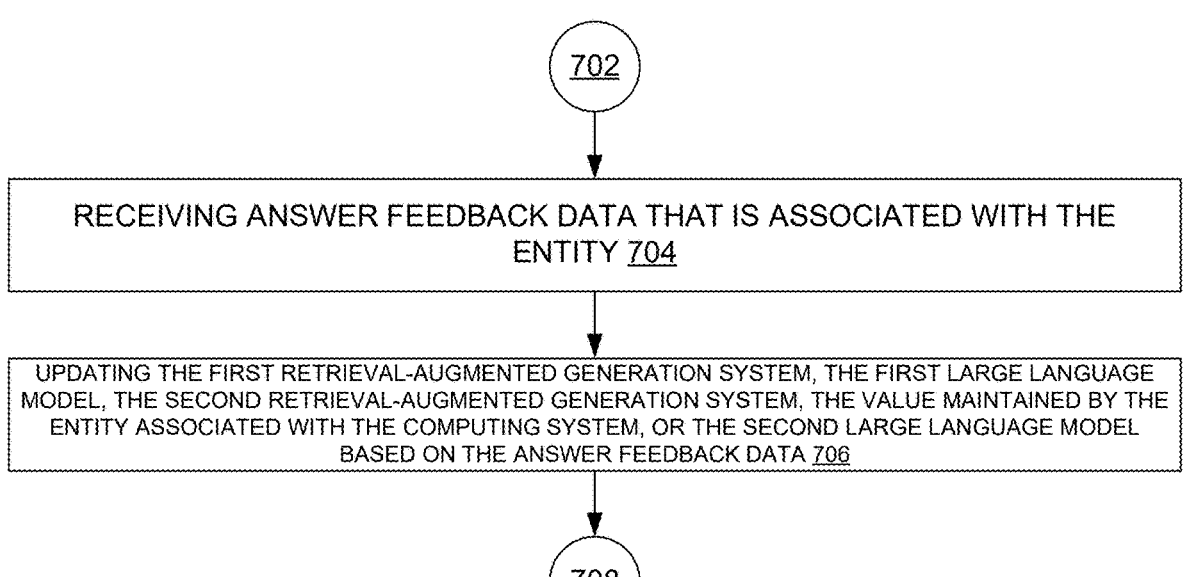
702
RECEIVING ANSWER FEEDBACK DATA THAT IS ASSOCIATED WITH THE ENTITY 704
UPDATING THE FIRST RETRIEVAL-AUGMENTED GENERATION SYSTEM, THE FIRST LARGE LANGUAGE MODEL, THE SECOND RETRIEVAL-AUGMENTED GENERATION SYSTEM, THE VALUE MAINTAINED BY THE ENTITY ASSOCIATED WITH THE COMPUTING SYSTEM, OR THE SECOND LARGE LANGUAGE MODEL BASED ON THE ANSWER FEEDBACK DATA 706
708
FIG. 7

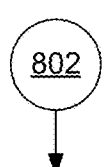

802

SENDING AN ALERT REGARDING OPERATION OF A COMPUTING SYSTEM OTHER THAN THE SYSTEM TO A FIRST RETRIEVAL-AUGMENTED GENERATION SYSTEM TO PRODUCE A FIRST PROMPT 804

INPUTTING THE FIRST PROMPT TO A FIRST LARGE LANGUAGE MODEL TO PRODUCE A FIRST ANSWER 806

SENDING THE ALERT TO A SECOND RETRIEVAL-AUGMENTED GENERATION SYSTEM TO PRODUCE A VALUE, WHEREIN THE VALUE INDICATES A PRINCIPLE THAT HAS MERIT TO AN ENTITY THAT IS ASSOCIATED WITH THE COMPUTING SYSTEM, AND WHEREIN THE SECOND RETRIEVAL-AUGMENTED GENERATION SYSTEM COMPRISES THE FIRST RETRIEVAL-AUGMENTED GENERATION SYSTEM OR ANOTHER RETRIEVAL-AUGMENTED GENERATION SYSTEM 808

INPUTTING THE FIRST ANSWER, THE VALUE, AND A SECOND PROMPT TO A SECOND LARGE LANGUAGE MODEL TO PRODUCE A SECOND ANSWER, WHEREIN THE SECOND LARGE LANGUAGE MODEL COMPRISES THE FIRST LARGE LANGUAGE MODEL OR ANOTHER LARGE LANGUAGE MODEL 810

INPUTTING THE SECOND ANSWER, INFORMATION ABOUT THE ENTITY THAT IS SEPARATE FROM THE VALUE, AND A THIRD PROMPT TO A THIRD LARGE LANGUAGE MODEL TO PRODUCE A THIRD ANSWER, WHEREIN THE THIRD LARGE LANGUAGE MODEL COMPRISES THE SECOND LARGE LANGUAGE MODEL OR ANOTHER LARGE LANGUAGE MODEL 812

MAKING THE THIRD ANSWER ACCESSIBLE TO A DEVICE ASSOCIATED WITH THE ENTITY 814

AFTER THE MAKING OF THE THIRD ANSWER ACCESSIBLE TO THE DEVICE ASSOCIATED WITH THE ENTITY, AND BASED ON DETERMINING THAT THE VALUE HAS CHANGED, STORING AN UPDATED VALUE 904

DETERMINING A FOURTH ANSWER BASED ON A SECOND ALERT REGARDING OPERATION OF THE COMPUTING SYSTEM BASED ON THE UPDATED VALUE 906

908

1000

1002

DETERMINING A RANKING OF RESPECTIVE VALUES OF THE GROUP OF VALUES 1004

DETERMINING THE THIRD ANSWER BASED ON THE RANKING 1006

1008

1100

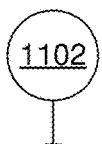

1102

COMMUNICATING AN ALERT REGARDING OPERATION OF A COMPUTING SYSTEM OTHER THAN THE SYSTEM TO A FIRST RETRIEVAL-AUGMENTED GENERATION SYSTEM RESULTING IN OBTAINING A FIRST PROMPT 1104

COMMUNICATING THE FIRST PROMPT TO A FIRST LARGE LANGUAGE MODEL RESULTING IN OBTAINING A FIRST ANSWER 1106

COMMUNICATING THE ALERT TO A SECOND RETRIEVAL-AUGMENTED GENERATION SYSTEM RESULTING IN OBTAINING A VALUE, WHEREIN THE VALUE INDICATES A CONCEPT THAT HAS BEEN SPECIFIED TO BE DESIRABLE TO AN ENTITY THAT IS ASSOCIATED WITH THE COMPUTING SYSTEM, AND WHEREIN THE SECOND RETRIEVAL-AUGMENTED GENERATION SYSTEM COMPRISES THE FIRST RETRIEVAL-AUGMENTED GENERATION SYSTEM OR ANOTHER RETRIEVAL-AUGMENTED GENERATION SYSTEM 1108

COMMUNICATING THE FIRST ANSWER, THE VALUE, AND A SECOND PROMPT TO A SECOND LARGE LANGUAGE MODEL RESULTING IN OBTAINING A SECOND ANSWER, WHEREIN THE SECOND LARGE LANGUAGE MODEL COMPRISES THE FIRST LARGE LANGUAGE MODEL OR ANOTHER LARGE LANGUAGE MODEL 1110

COMMUNICATING THE SECOND ANSWER, INFORMATION ABOUT THE ENTITY THAT IS SEPARATE FROM THE VALUE, AND A THIRD PROMPT TO A THIRD LARGE LANGUAGE MODEL RESULTING IN OBTAINING A THIRD ANSWER, WHEREIN THE THIRD LARGE LANGUAGE MODEL COMPRISES THE SECOND LARGE LANGUAGE MODEL OR ANOTHER LARGE LANGUAGE MODEL 1112

PERMITTING THE THIRD ANSWER TO BE ACCESSED VIA A DEVICE ASSOCIATED WITH THE ENTITY 1114

RECOMMENDATION GENERATION WITH USER VALUES

BACKGROUND

A recommendation system can generally comprise a computer system that provides information to a user account that is deemed relevant.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify an alert regarding operation of a computing system other than the system. The system can obtain a first prompt as output from inputting the alert to a first retrieval-augmented generation system. The system can obtain a first answer as output from inputting the first prompt to a first large language model. The system can obtain a value maintained by an entity associated with the computing system as output from inputting the alert to a second retrieval-augmented generation system, wherein the second retrieval-augmented generation system comprises the first retrieval-augmented generation system or another retrieval-augmented generation system different from the first retrieval-augmented generation system. The system can obtain a second answer as output from inputting the first answer, the value maintained by the entity associated with the computing system, and a second prompt to a second large language model, wherein the second large language model comprises the first large language model or another large language model different from the first large language model. The system can obtain a third answer as output from inputting the second answer, information about the entity that is separate from the value, and a third prompt to a third large language model, wherein the third large language model comprises the second large language model or another large language model different from the second large language model. The system can enable the third answer to be accessible via a device associated with the entity.

An example method can comprise sending, by a system comprising at least one processor, an alert regarding operation of a computing system other than the system to a first retrieval-augmented generation system to produce a first prompt. The method can further comprise inputting, by the system, the first prompt to a first large language model to produce a first answer. The method can further comprise sending, by the system, the alert to a second retrieval-augmented generation system to produce a value, wherein the value indicates a principle that has merit to an entity that is associated with the computing system, and wherein the second retrieval-augmented generation system comprises the first retrieval-augmented generation system or another retrieval-augmented generation system. The method can further comprise inputting, by the system, the first answer, the value, and a second prompt to a second large language model to produce a second answer, wherein the second large language model comprises the first large language model or another large language model. The method can further comprise inputting, by the system, the second answer, information about the entity that is separate from the value, and a third prompt to a third large language model to produce a third answer, wherein the third large language model comprises the second large language model or another large language model. The method can further comprise making, by the system, the third answer accessible to a device associated with the entity.

An example non-transitory computer-readable medium can comprise instructions that, in response to execution, cause a system comprising a processor to perform operations. These operations can comprise communicating an alert regarding operation of a computing system other than the system to a first retrieval-augmented generation system resulting in obtaining a first prompt. These operations can further comprise communicating the first prompt to a first large language model resulting in obtaining a first answer. These operations can further comprise communicating the alert to a second retrieval-augmented generation system resulting in obtaining a value, wherein the value indicates a concept that has been specified to be desirable to an entity that is associated with the computing system, and wherein the second retrieval-augmented generation system comprises the first retrieval-augmented generation system or another retrieval-augmented generation system. These operations can further comprise communicating the first answer, the value, and a second prompt to a second large language model resulting in obtaining a second answer, wherein the second large language model comprises the first large language model or another large language model. These operations can further comprise communicating the second answer, information about the entity that is separate from the value, and a third prompt to a third large language model resulting in obtaining a third answer, wherein the third large language model comprises the second large language model or another large language model. These operations can further comprise permitting the third answer to be accessed via a device associated with the entity.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example table of values and data/metrics for those values, and that can facilitate recommendation generation with user values, in accordance with an embodiment of this disclosure;

FIG. 5 illustrates an example process flow that can facilitate recommendation generation with user values, in accordance with an embodiment of this disclosure;

FIG. 6 illustrates another example process flow that can facilitate recommendation generation with user values, in accordance with an embodiment of this disclosure;

FIG. 7 illustrates another example process flow that can facilitate recommendation generation with user values, in accordance with an embodiment of this disclosure;

FIG. 8 illustrates another example process flow that can facilitate recommendation generation with user values, in accordance with an embodiment of this disclosure;

FIG. 11 illustrates another example process flow that can facilitate recommendation generation with user values, in accordance with an embodiment of this disclosure.

DETAILED DESCRIPTION

Overview

Figure 1:
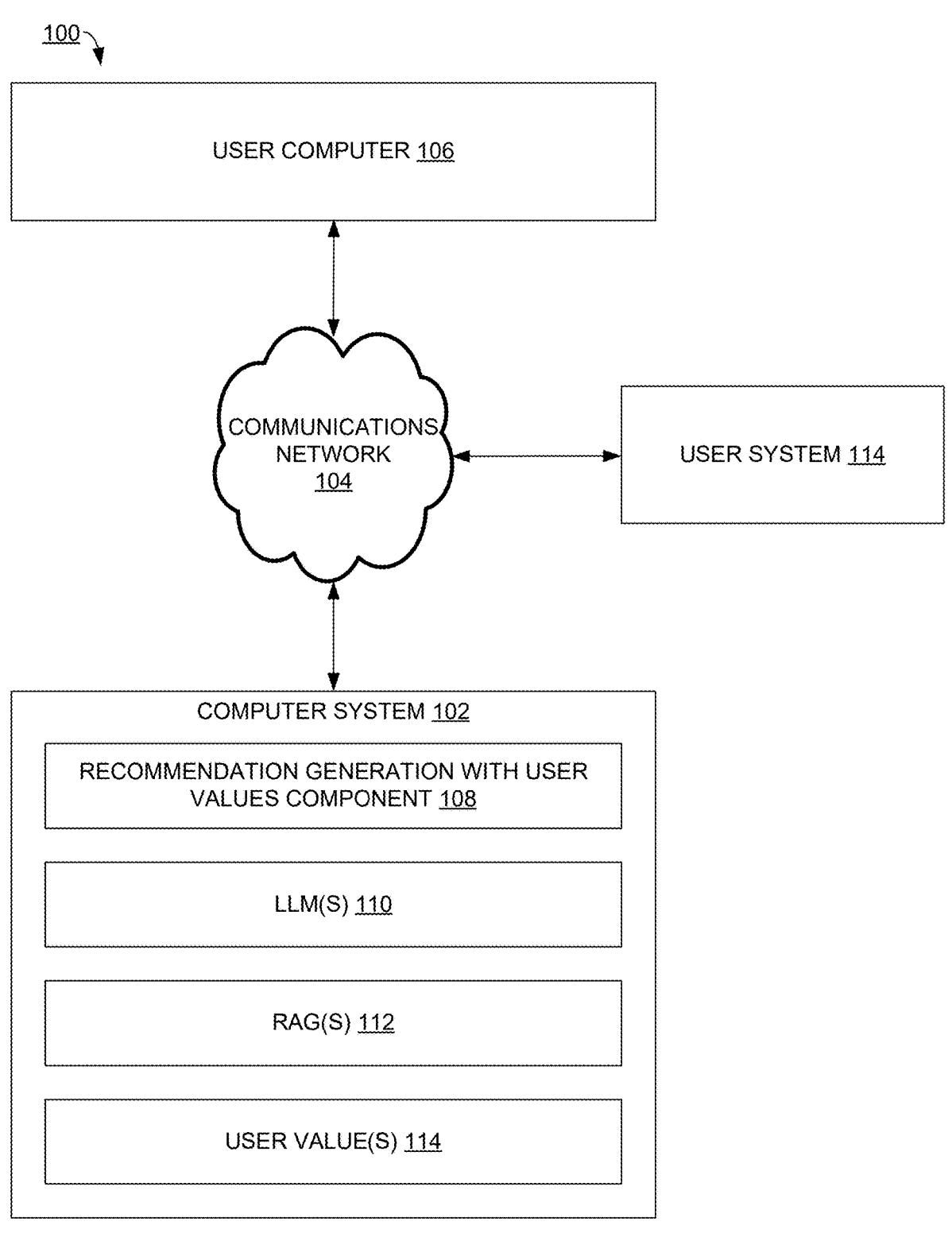
FIG. 1 illustrates an example system architecture that can facilitate recommendation generation with user values, in accordance with an embodiment of this disclosure.

As used herein, user values can refer to to the principles, beliefs, and priorities that guide an individual's behavior, decision-making, and interactions with others. In this context, user values can be associated with the organization values that a particular users need to follow (e.g., as a member of that organization). These values can be shaped by various factors of an organization, such as company sustainability goals and background, etc.

User values can be explicit and they can be implicit. Explicit values can comprise user values that are explicitly provided by the user to a system that implements the present techniques, and that can be utilized as is without further analysis as to what they are. Implicit values can comprise user values that are derived from different interactions with the user, after performing analysis on those interactions (which can be viewed in contrast to the explicit values that can be determined without further analysis).

The present techniques can be implemented to enhance recommendation systems by incorporating user-centric values and existing customer profiles, which can be overlooked in prior approaches. By utilizing prompt chaining alongside large language models (LLMs), the present techniques can generate customized recommendations that align more closely with individual user information and values compared with prior approaches.

Through a sequence of adaptively adjusted prompts, a system according to the present techniques can capture and evaluate intricate user data, including both stated and analyzed values, as well as basic profile and contextual information. This approach can both improve the accuracy of recommendations, and also ensure a personalized nature and alignment with user values, effectively addressing the inherent limitations of current recommendation engines.

In the domain of recommendation systems, prior approaches can often overlook individual user values and fail to leverage user information effectively to tailor recommendations accordingly. This oversight can result in recommendations that do not align with user preferences and values, leading to unhelpful suggestions, irrelevant content, and low adoption rates of recommendations.

Research can indicate that users assess recommendations based on various values, including a primary value and one or more secondary values. Here, values can refer to a person's principles or standards of behavior, reflecting what they deem important in life. In the context of this disclosure, values can represent the company's core principles and criteria for business criticality, or what users consider essential for specific tasks. Moreover, these user values can be reflected across multiple modalities apart from unstructured texts including structured data such as tables, audio recordings, configuration images and many more. Therefore, specialized handling of each of these modalities can be required to obtain a comprehensive view of the users' values.

An ability to translate these values, which can manifest as non-specific needs, into measurable metrics, can be utilized for capturing user requirements and making successful recommendations.

The present techniques can facilitate transforming recommendation systems by incorporating user-centric values and user information. The present techniques can utilize prompt chaining with large language models (LLMs) and retrieval-augmented generation (RAG) to enhance the generation of tailored recommendations for end users while considering their values. Prompt chaining can comprise feeding prompts to an LLM sequentially, refining each prompt based on the output of the previous one. Different LLMs and different RAGs that can be tailored to specific user value and its data type can reinforce the accuracy of prompt chaining through tailoring the recommendation with individual user values, one at a time. This can create a customized query path that captures nuanced user data, including inputs such as user values.

A problem with prior approaches to recommendation systems can be exemplified by the following scenario. John Doe, an information technology (IT) manager, serves as both the user and decision-maker for his company's storage system. The system offers recommendations based on telemetry and usage data of the storage. One day, John receives a recommendation to transition to a new type of storage hardware and increase storage capacity. The system projects significant cost savings, aligning with John's primary goal of cost reduction, making the recommendation appealing. However, John's organization has clear sustainability goals and regulations to meet. Thus, he must ensure that recommendations also align with his secondary value of sustainability.

With multiple values and goals to consider, John can be uncertain if the recommendation remains viable. Acquiring new hardware can potentially increase the carbon footprint, a factor not addressed by the system's recommendation. Consequently, John opts not to adopt the recommendation until he conducts a more comprehensive analysis to ensure alignment with his values.

This scenario highlights typical issues prior recommendation systems, including neglecting user values in recommendations, a lack of relevance in considered user values, and inflexible recommendation models.

Regarding neglecting user values in recommendations, prior recommendation systems can often fail to incorporate user-prioritized values when delivering recommendations. This oversight can disregard essential user and organizational values, influencing the quality of recommendations and diminishing user acceptance rates.

Regarding a lack of relevance in considered user values, it can be that prior personalized recommendation systems that account for user values cannot filter values relevant to the specific issue requiring recommendation. That is, it can be that they do not take into account the multi-modal data sources that can provide the essential contexts for user values to be interpreted correctly and specifically for a particular user. For example, recommendations based solely on generic values like cost savings can overlook other critical factors such as sustainability.

Regarding inflexible recommendation models, prior recommendation systems can typically rely on static models that cannot adapt to changes in user values and interactions over time. This inflexibility can lead to outdated or irrelevant recommendations that do not align with evolving user interests and needs. Consequently, these recommendations can lack accuracy and relevance to the user's current values and preferences.

In some examples, the present techniques can be implemented via a fusion of prompt chaining with Large Language Models (LLMs) and multiple Retrieval-Augmented Generation (RAGs), enhancing the process of generating personalized recommendations for end users.

Prompt chaining can involve sequentially presenting prompts to a LLM, refining each prompt based on the output of the previous one. This can create a tailored query path that incorporates nuanced user values data into the recommendation process, derived from multiple multi-modal user data sources that can be unstructured and structured including audio recordings input, user text inputs, values and issues descriptions, configuration images, values prioritizations, basic profile information, etc.

In examples of the present techniques, a prompt chaining RAG/LLM implementation can be utilized, where an initial query can be made to a RAG/LLM with an enterprise knowledge base. The resulting answer can be then combined iteratively with prioritized user values from different sources to generate new answers for subsequent prompts. In some examples, each RAG can be specific to a particular user value type and for each prompt chaining iteration, the LLM that can be used can also be the best-fit model for the particular user value. Through multiple iterations of integrating prioritized values into the prompt, the final prompt can be inputted into the LLM to produce a recommendation for the user. This approach can ensure that recommendations can be highly accurate and personalized, taking into account the user's specific prioritized values and information, creating a narrative for the user.

Furthermore, in some examples, the present techniques can dynamically adjust to users' evolving priorities, values, and needs, ensuring that recommendations remain relevant over time. By incorporating both stated and prioritized user values, along with inferred values based on user information, a system that implements the present techniques can deliver recommendations closely aligned with the user's preferences. Leveraging LLMs can enable a sophisticated understanding of user data, allowing a system that implements the present techniques to discern subtle nuances in user behavior and preferences that can often be overlooked by prior approaches to recommendation engines.

Examples of process flows are shown in the below FIGS. 3-4, which showcase possibilities of incorporating different RAGs being used for different user values and different LLMs being used to process different types of user value data.

In contrast to prior recommendation engines that rely on static algorithms, the present techniques can utilize a series of dynamically generated prompts fed into an LLM.

Each prompt in the chain can be refined based on the output of the previous one, facilitating a progressive and thorough understanding of the user. This approach can enable the generation of highly customized, relevant, and useful recommendations.

Furthermore, the preset techniques can enable the implementation of flexible and dynamic models capable of adapting to changes in user values and interactions over time. This adaptability can ensure that the recommendations produced remain accurate, relevant, and tailored to the evolving needs of users.

The present techniques can facilitate an integration of user values and user information (which can be derived from existing user data) into a recommendation process.

By retrieving matched user value keywords and telemetry associated with a specific alert, the user values can be more accurately linked to the particular issue at hand. Furthermore, by incorporating these issue-relevant user values and user information into the generation of prompts, the present techniques can ensure that all recommendations align with the user's values, which is a feature often lacking in prior approaches. The present techniques can improve (or maximize) a utility of existing user profile data, ensuring that each recommendation can be highly personalized and relevant.

The present techniques can facilitate using multiple user value RAGs and different LLMs to process specific user values in the prompt chaining to ensure accuracy and effectiveness. That is, the nature and nuance of user values being expressed in various form of data can be considered. The data can be multi-modal with a combination of structured and unstructured data. Therefore, RAG and LLM instances can be used for the variety of different user values along with their respective prompts to ensure that the prompt chaining ca give an accurate result with its full attention to specific user value at each prompt chain level.

The following scenario illustrates an example of the present techniques. A customer of a cloud platform receives an alert indicating that their storage performance has fallen below the set threshold.

The alert information can be processed through a GenAI RAG to generate an Alert Prompt, which can be then input into a LLM to obtain a first layer of Answer #1 containing referenced documents that address the specific performance alert issue.

Simultaneously, the alert information can be used to retrieve matched user value keywords and telemetry, generating a list of relevant prioritized user values for this alert issue.

For the prioritized User Value #1 (e.g., cost efficiency), this can be combined with Answer #1 to be fed into the LLM, which can produce an Answer #2 with the referenced documents on recommendations.

Then this Answer #2 can be fed into the LLM again with the prioritized User Value #2 (e.g., sustainability) which can produce an Answer #3 with the referenced documents.

Then this Answer #3 will then be fed to the LLM another time with the prioritized User Value #3 (e.g., time to resolution) which can produce Answer #4 with the reference documents.

Finally, the last Answer #4 can be combined with basic user information and inputted into the LLM to generate the final recommendation to the user.

This final recommendation can be tailored to:

Address the stated performance alert.

Reflect the relevant and prioritized user values of cost efficiency, sustainability, and time to resolution.

The user can find the recommendation to be highly relevant and aligned with their values, prompting them to adopt the recommendation to resolve the alert.

The present techniques can facilitate contextualizing prompts in terms of telemetry data. In the domain of observability and proactive maintenance, temporal context can capture rich information about the current state of the system and the severity of the alert messages generated. This can be even more important when aligning to specific user values that can be inherently non-stationary in nature. For example, return on investment (ROI) as one of the user values can depend on the temporal dimension and can be incorporated with the temporal information into the prompts for the LLM to generate appropriate response. This insight is lacking in prior approaches.

The present techniques can facilitate personalizing LLM response through prompt chaining with user values. Prior approaches to eliciting personalized responses from LLMs can include retrieving user-specific information and building a single contextual prompt from it, and making an architectural change to the LLM embedding layer to accept additional embeddings specific to the contextual information of the user.

Prompt chaining can generally be used to simplify a complex task into smaller subtasks to be completed by the LLM, and this can be effective in those scenarios. Information Retrieval (IR) practitioners (a predecessor of LLM and RAG engines) can view the task of contextualizing any language model response specific to user values and goals as a single-step process. Therefore, from the traditional IR point-of-view it can seem to not be a use case that should be decomposed into multiple subtasks where prompt chaining can be employed. Deviating from this viewpoint, the present techniques can consider the user values and goals to have multiple aspects, each of which can receive specialized treatment that lends itself to creating a story or narrative to the insights that will be presented in the outcome. That is, the present techniques can involve modeling the personalization of LLM response catering to user values as a multi-step task, such as for prompt chaining.

The present techniques can facilitate an application of LLMs in observability space. Generally, personalized recommendation engines can be employed in an information retrieval setting where the user interacts with the system with a specific intent in mind. This can be an area of applications for any information seeking agents that use language as the primary medium including search engines, language models and query processing systems. The observability and proactive maintenance domain can be significantly different from an information retrieval setting as there can be often minimal scope for a two-way interaction between the user and the system (e.g., alert mechanisms can be implemented as a one-way messaging service with little or no provision for the user to interact back). However, the present techniques can facilitate utilizing LLM and RAG pipelines to modernize typical alert mechanisms, showing the applicability of language models beyond typical information retrieval scenarios.

The present techniques can be implemented via prompt chaining. Prompt chaining can be effective in deriving more accurate outcomes when working with multi-modal data, complex and large databases, and a mix of structured and unstructured data. Prompt chaining can offer more accurate results through multi-layer tuning. Prompt chaining can provide flexibility in data transformation between the steps of the chaining, which can be crucial when dealing with different data modalities.

Regarding user values, user values can be inherently multi-modal, encompassing both structured and unstructured data. User values can be complex and often not easily explained through text alone, as the contextual nuance can be missed. Diverse types of data can be required to accurately interpret and derive user values.

Examples of user values raw data include:
Support call audio recordings that can highlight significant user frustration related to certain values.
Images and charts provided by users to help support personnel understand and resolve issues.
Customized dashboard widgets and exported images that users monitor for reporting purposes.

User values data can be both unstructured (e.g., user text inputs describing issues and preferred resolutions) and structured (e.g., user data and metrics).

Prompt chaining for multi-modal data can include processing multi-modal and mixed structured and unstructured user values data using prompt-chaining, which can ensure the most accurate user-value-considered recommendations. It can also address a need to automatically detect user context. With or without user-supplied values, this model can utilize data from different user interactions to derive user values and apply those to recommendations.

Figure 3:
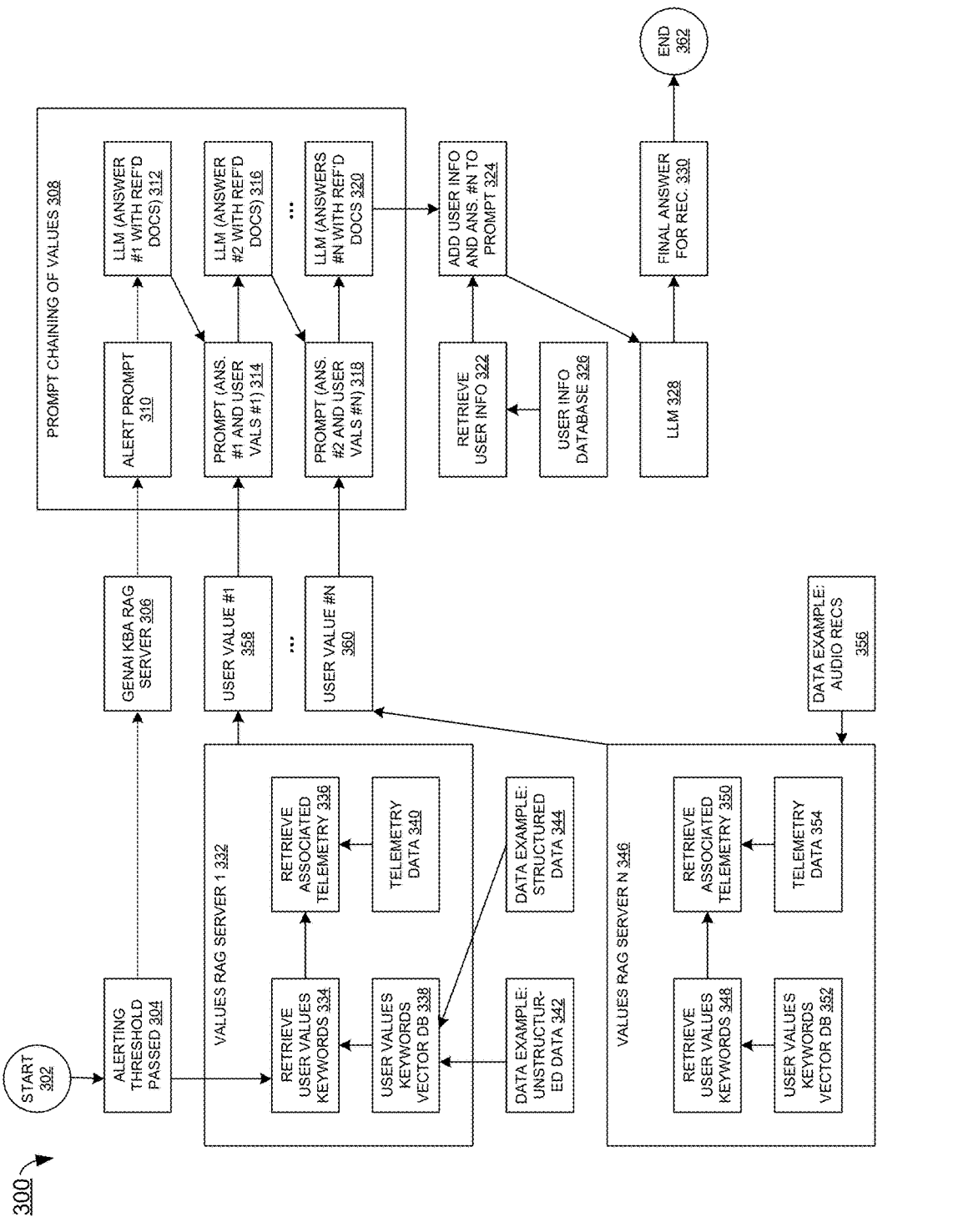
FIG. 3 illustrates an example system architecture of multiple retrieval-augmented generation systems (RAGs) with one or more large language models (LLMs), and that can facilitate recommendation generation with user values, in accordance with an embodiment of this disclosure.
Figure 4:
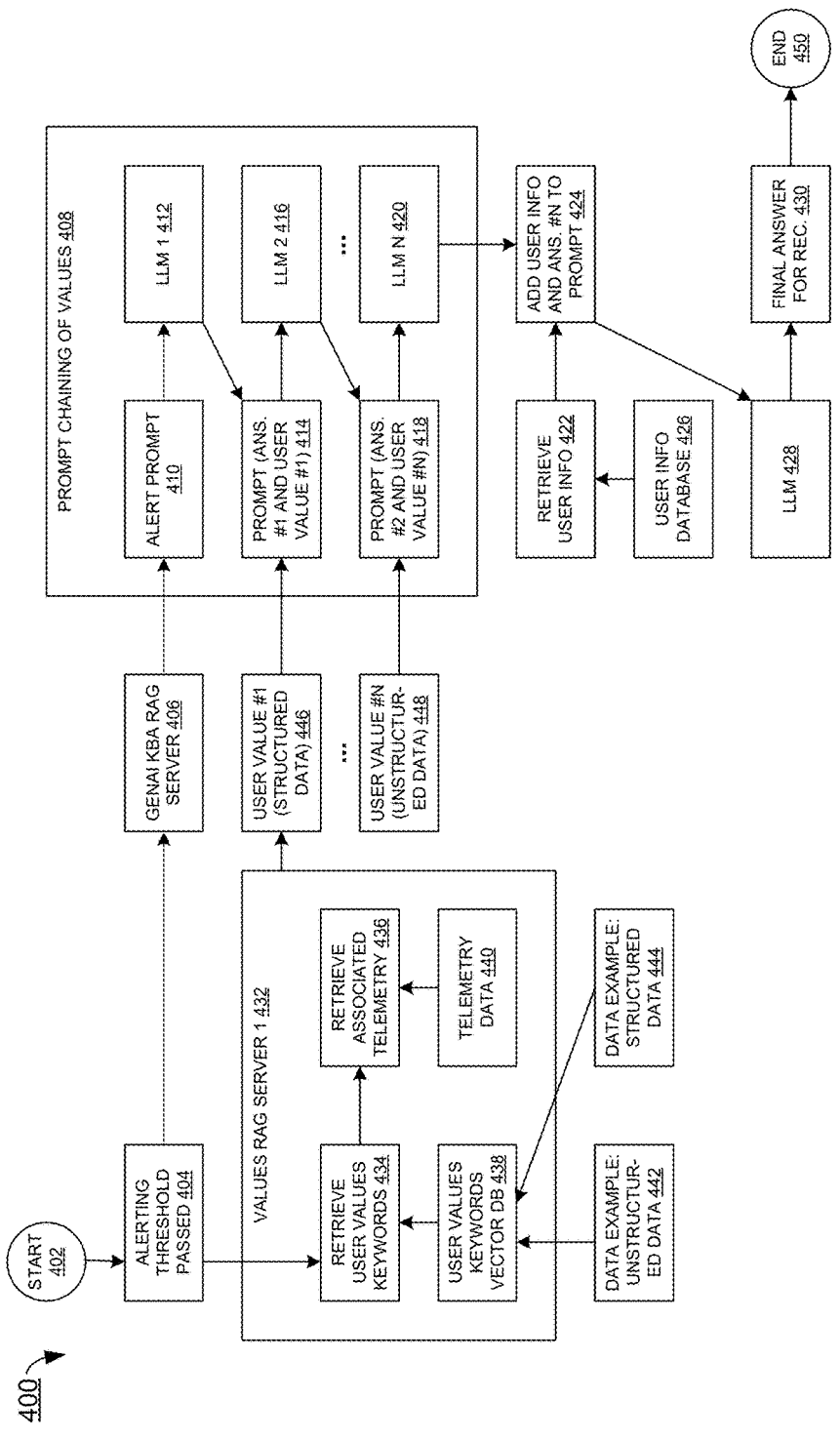
FIG. 4 illustrates an example system architecture of one RAG with different LLMs, and that can facilitate recommendation generation with user values, in accordance with an embodiment of this disclosure.

FIGS. 3 and 4 can illustrate examples where multi-modal and mixed of structured and unstructured user values data can be processed using prompt-chaining to provide accurate user-value-considered recommendations.

An ability to bring in multi-modal data can also address a need to automatically detect user context. With or without user supplied values, this model can be able to utilize data from different user interactions to derive user values and apply those to recommendations with the different user value RAGs and the different LLMs that work well with particular user value data types.

Example Architectures, Tables, and Flows

FIG. 1 illustrates an example system architecture 120 that can facilitate recommendation generation with user values, in accordance with an embodiment of this disclosure.

System architecture 120 comprises computer system 102, communications network 104, user computer 106, and user system 114. In turn, computer system 102 comprises recommendation generation with user values component 108, LLM(s) 110, RAG(s) 112, and user value(s) 114.

Figure 12:
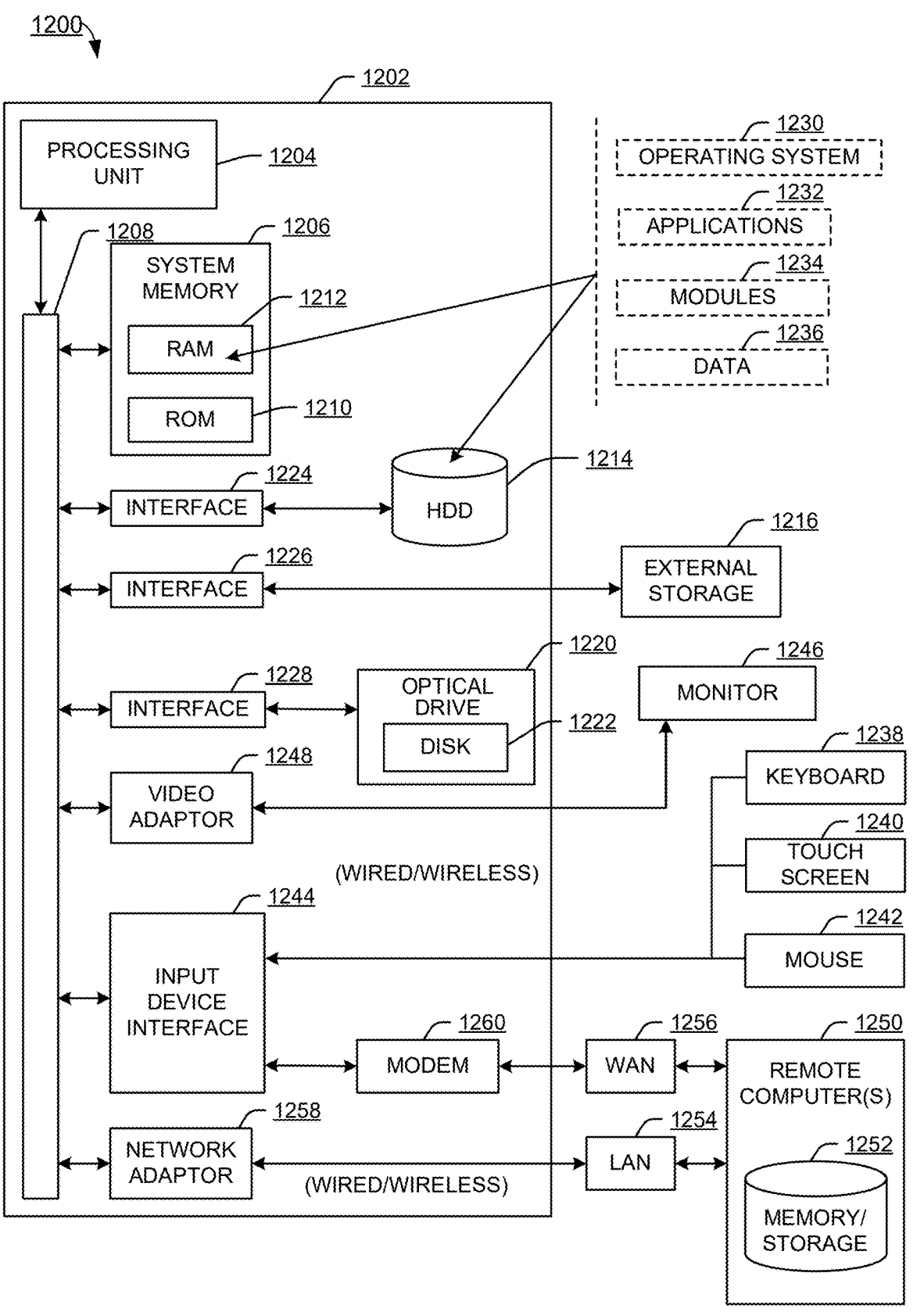
FIG. 12 illustrates an example block diagram of a computer operable to execute an embodiment of this disclosure.

Each of computer 122 and/or user computer 106 can be implemented with part(s) of computing environment 1200 of FIG. 12. Communications network 104 can comprise a computer communications network, such as the Internet, or an isolated private computer communications network.

An alert can be raised for user system 116 (which can comprise a system of one or more computers associated with a user). In some examples, this alert can indicate that computer system 116 is operating outside of operating parameters that are considered to be normal operation. Based on that alert, recommendation generation with user values component 108 can determine a recommendation to make to remediate the alert, and provide that recommendation to user computer 106 (such as to an administrator account for user system 116 at user computer 106).

In making this recommendation, recommendation generation with user values component 108 can consider user value(s) 114 associated with user system 116, and can use one or more LLMs of LLM(s) 110 and one or more RAGs of RAG(s) 112 to make this recommendation based on user value(s) 114.

In some examples, recommendation generation with user values component 108 can implement part(s) of the process flows of FIGS. 5-11 to facilitate recommendation generation with user values.

It can be appreciated that system architecture 120 is one example system architecture for recommendation generation with user values, and that there can be other system architectures that facilitate recommendation generation with user values.

FIG. 2 illustrates an example table 200 of values and data/metrics for those values, and that can facilitate recommendation generation with user values, in accordance with an embodiment of this disclosure. In some examples, part(s) of table 200 can be implemented by part(s) of system architecture 100 of FIG. 1 to facilitate recommendation generation with user values.

Table 200 comprises values 202 and corresponding data and metrics 204. This information in table 200 can be used to generate a response to a user query that accounts for values of that user or organization.

FIG. 3 illustrates an example system architecture 300 of multiple retrieval-augmented generation systems (RAGs) with one or more large language models (LLMs), and that can facilitate recommendation generation with user values, in accordance with an embodiment of this disclosure. In some examples, part(s) of system architecture 300 can be implemented by part(s) of system architecture 100 of FIG. 1 to facilitate recommendation generation with user values.

System architecture 300 comprises start 302, alerting threshold passed 304, GenAI KBA RAG server 306, prompt chaining of values 308, alert prompt 310, LLM (answer #1 with referenced documents) 312, prompt (answer #1 and user values #1) 314, LLM (answer #2 with referenced documents) 316, prompt (answer #2 and user values #N) 318, LLM (answers #N with referenced documents 320, retrieve user info 322, add user info and answer #N to prompt 324, user info database 326, LLM 328, final answer for recommendation 330, values RAG server 1 332, retrieve user values keywords 334, retrieve associated telemetry 336, user values keywords vector database 338, telemetry data 340, data example: unstructured data 342, data example: structured data 344, values RAG server N 346, retrieve user values keywords 348, retrieve associated telemetry 350, user values keywords vector database 352, telemetry data 354, data example: audio recordings 356, user value #1 358, user value #N 360, and end 362.

With system architecture 300, the following flow can occur:

0. Users use their environments and conduct their daily operation tasks. They can call support for help, submit a support ticket by describing their needs and requests, etc. Users can also define and prioritize their values in the system, while the system captures user information in the user info database in the backend.

a. In some examples, when users are explicitly asked about their values, users can have the option to rank values based on their priorities during definition.

b. The system can associate values with weights to indicate their importance to the user based on context analysis, using prompts such as, "X is be the most important value, assign weights Y."

1. User values related data and user-defined and prioritized values can be stored in the values RAG servers. The different values can be stored and processed in different RAG that can be specific to the particular user value. For instance, Value RAG Server N (FIG. 3) can be one that takes care of audio recording type of data and processes it to interpret the particular user value.

2. When an event surpasses the alert threshold and passes health checks:

a. The system can retrieve matched and relevant user value keywords and telemetry to compile a list of prioritized user values for the alert (e.g., user value #1 . . . #N).

b. The alert information can be used to generate an embedded prompt passed through a knowledge base article (KBA) RAG server to feed into the LLM.

c. Alert+generative artificial intelligence (GenAI) RAG Answer #1:

i. The system can create alert query embeddings and sends them to a GenAI RAG server to generate a prompt, which can be then fed to the LLM to produce Answer #1.

ii. Answer #1 can be then generated and it—along with referenced documents—can be used in the next step.

d. Answer #1 with referenced documents+User Value #1 (from Values RAG server 1)→Answer #2:

i. Answer #1 can be embedded into the prompt along with User Priority Value #1's keywords to generate Answer #2, along with reference documents.

e. Answer #2 with referenced documents+User Value #N (from Values RAG server N) 2→Answer #3N+1:

i. Answer #N+1 can be embedded into the prompt along with User Priority Value #N's keywords to generate Answer #3, along with reference documents. The user value N can be pulled from the RAG Server N that takes specific user values data (such as audio recordings).

f. Answer #N+1+User Info.→Final prompt for LLM i. User information retrieved from the User Info Database, and combined with the previous Answer #N+1, can be added to the final prompt for the LLM.

3. The final prompt can be fed into the LLM to generate the final recommendation answer, which can take into account relevant user values information and the user-specific information.

FIG. 4 illustrates an example system architecture 400 of one RAG with different LLMs, and that can facilitate recommendation generation with user values, in accordance with an embodiment of this disclosure. In some examples, part(s) of system architecture 400 can be implemented by part(s) of system architecture 100 of FIG. 1 to facilitate recommendation generation with user values.

System architecture 400 comprises start 402, alerting threshold passed 404, GenAI KBA RAG server 406, prompt chaining of values 408, alert prompt 410, LLM 1 412, prompt (answer #1 and user value #1) 414, LLM 2 416, prompt (answer #2 and user value #N) 418, LLM N 420, retrieve user info 422, add user info and answer #N to prompt 424, user info database 426, LLM 428, final answer for recommendation 430, values RAG server 1 432, retrieve user values keywords 434, retrieve associated telemetry 436, user values keywords vector database 438, telemetry data 440, data example: unstructured data 442, data example: structured data 444, user value #1 (structured data) 446, user value #N (unstructured data) 448, and end 450.

With system architecture 400, the following flow can occur:

0. Users use their environments and conduct their daily operation tasks. They can call support for help, submit support ticket by describing their needs and asks, etc. Users can also define and prioritize their values in the system, while the system captures user information in the User Info Database in the backend.

a. In some examples, when users are explicitly asked about their values, users can have the option to rank values based on their priorities during definition.

b. The system can associate values with weights to indicate their importance to the user based on context analysis, using prompts such as "X is be the most important value, assign weights X".

1. User values related data and user-defined and prioritized values can be stored in the Values RAG servers. The different values can be stored and processed in different RAGs that can be specific to the particular user value.

2. When an event surpasses the alert threshold and passes health checks:

a. The system can retrieve matched and relevant user value keywords and telemetry to compile a list of prioritized user values for the alert (User value #1 . . . #N).

b. The alert information can be used to generate an embedded prompt passed through a KBA RAG server to feed into LLM 1.

c. Alert+GenAI RAG→Answer #1:

i. The system can create alert query embeddings and sends them to the GenAI RAG server to generate a prompt, which can be then fed to the LLM1 to produce Answer #1.

ii. Answer #1 can be then generated and it along with referenced documents, can be used in the next step.

d. Answer #1 with referenced documents+User Value #1 (from Values RAG server 1)+LLM 2→Answer #2:

i. Answer #1 can be embedded into the prompt along with User Priority Value #1's keywords and get passed to the LLM. This LLM can be the same LLM1 as the first prompt chaining or it can be a new LLM like LLM2 (FIG. 4) that can be more suitable for a particular type of user value data (user value #1) to generate Answer #2, along with reference documents.

e. Answer #2 with referenced documents+User Value #N (from Values RAG server) 2+LLM N→Answer #3N+1:

i. Answer #N+1 can be embedded into the prompt along with User Priority Value #N's keywords and get passed to a LLM to get the answer. This LLM can be a similar or a different LLM. In this case (FIG. 4), it gets passed through LLM N to generate Answer #3, along with reference documents.

f. Answer #N+1+User Information→Final prompt for LLM i. User information retrieved from the User Info Database and combined with the previous Answer #N+1 can be added to the final prompt for the LLM.

3. The final prompt can be fed into the LLM to generate the final recommendation answer, which can take into account all relevant user values information and the user-specific information.

Example Process Flows

FIG. 5 illustrates an example process flow 500 that can facilitate recommendation generation with user values, in accordance with an embodiment of this disclosure. In some examples, one or more embodiments of process flow 500 can be implemented by system architecture 100 of FIG. 1, or computing environment 1200 of FIG. 12.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 500 begins with 502, and moves to operation 504.

Operation 504 depicts identifying an alert regarding operation of a computing system other than the system. This can be similar to alerting threshold passed 304 of FIG. 3 and/or alerting threshold passed 404 of FIG. 4.

After operation 504, process flow 500 moves to operation 506.

Operation 506 depicts obtaining a first prompt as output from inputting the alert to a first retrieval-augmented generation system. This can be similar to utilizing GenAI KBA RAG server 306 of FIG. 3 to produce alert prompt 310, and/or utilizing GenAI KBA RAG server 406 of FIG. 4 to produce alert prompt 410.

After operation 506, process flow 500 moves to operation 508.

Operation 508 depicts obtaining a first answer as output from inputting the first prompt to a first large language model. This can be similar to producing an output from LLM (answer #1 with referenced documents) 312 of FIG. 3, and/or producing an output from LLM 1 412 of FIG. 4.

After operation 508, process flow 500 moves to operation 510.

Operation 510 depicts obtaining a value maintained by an entity associated with the computing system as output from inputting the alert to a second retrieval-augmented generation system, wherein the second retrieval-augmented generation system comprises the first retrieval-augmented generation system or another retrieval-augmented generation system different from the first retrieval-augmented generation system. This can be similar to producing user value 1 358 from values RAG server 1 332 of FIG. 3, and/or producing user value 1 (structured data 446) from values RAG server 1 432 of FIG. 4.

In some examples, the second retrieval-augmented generation system comprises a keywords vector data store of user values that comprise the value maintained by the entity associated with the computing system. This can be similar to user values keywords vector database 338 of FIG. 3, and/or user values keywords vector database 438 of FIG. 4.

In some examples, operation 510 comprises storing information from unstructured text data in the keywords vector data store. This can be similar to data example: unstructured data 342 of FIG. 3, and/or data example: unstructured data 442 of FIG. 4.

In some examples, operation 510 comprises storing information from structured text data, audio data, image data, video data, or interaction data in the keywords vector data store. This can be similar to data example: structured data 344 of FIG. 3, and/or data example: structured data 444 of FIG. 4.

In some examples, operation 510 comprises determining the value maintained by the entity associated with the computing system based on implicit information that is derived from actions taken by the entity, wherein the actions taken by the entity are separate from explicitly identifying the value. That is, recommendations can be generated based on user values that are implicit (e.g., derive through analysis) and/or explicit (e.g., a user explicitly provides this information). In some examples, implicit values can be derived from user action analysis, such as customer support conversations and prompts entered to search from answers. This implicit determination of user values can be distinct from users explicitly providing and ranking their values. This implicity values analysis can be a separate analysis from an explicit values process (where the explicit values are provided directly by the users).

In some examples, the second retrieval-augmented generation system comprises telemetry data that corresponds to the computing system. This can be similar to telemetry data 340 of FIG. 3, and/or telemetry data 440 of FIG. 4.

After operation 510, process flow 500 moves to operation 512.

Operation 512 depicts obtaining a second answer as output from inputting the first answer, the value maintained by the entity associated with the computing system, and a second prompt to a second large language model, wherein the second large language model comprises the first large language model or another large language model different from the first large language model. This can be similar to producing an output from LLM (answer #2 with referenced documents) 316 of FIG. 3, and/or producing an output from LLM 2 416 of FIG. 4.

After operation 512, process flow 500 moves to operation 514.

Operation 514 depicts obtaining a third answer as output from inputting the second answer, information about the entity that is separate from the value, and a third prompt to a third large language model, wherein the third large language model comprises the second large language model or another large language model different from the second large language model. This can be similar to producing an output from LLM (answer #N with referenced documents) 320 of FIG. 3, and/or producing an output from LLM N 420 of FIG. 4.

This information about the entity that is separate from the value can generally be referred to as user information. It can be generalized as information about what the user is rather than information about what the user values. Examples of user information can include an account identifier, the user's role and/or title with regard to the computer system, information about products of the computer system that have been purchased by the user, the user's level of access with regard to the computer system, and/or the user's preference settings with regard to the computer system.

After operation 514, process flow 500 moves to operation 516.

Operation 516 depicts enabling the third answer to be accessible via a device associated with the entity. This can be similar to final answer for recommendation 330 of FIG. 3, and/or to final answer for recommendation 430 of FIG. 4.

After operation 516, process flow 500 moves to 518, where process flow 500 ends.

FIG. 6 illustrates another example process flow 600 that can facilitate recommendation generation with user values, in accordance with an embodiment of this disclosure. In some examples, one or more embodiments of process flow 600 can be implemented by system architecture 100 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of process flow 500 of FIG. 5, process flow 700 of FIG. 7, process flow 800 of FIG. 8, process flow 900 of FIG. 9, process flow 1000 of FIG. 10, and/or process flow 1100 of FIG. 11.

Process flow 600 begins with 602, and moves to operation 604.

In some examples where process flow 600 is implemented in conjunction with process flow 500 of FIG. 5, the inputting of the alert to the second retrieval-augmented generation system results in output of a group of values that comprise the value.

Operation 604 depicts inputting the first answer, respective values of the values, and the second prompt to respective large language models of a group of at least one large language model that comprises the second large language model to obtain the second answer. This can be implemented in a similar manner as corresponding operations in process flow 500 of FIG. 5.

After operation 604, process flow 600 moves to operation 606.

Operation 606 depicts chaining the output to another iteration. That is, prompt chaining of multiple user values can be performed to factor all those user values into determining an answer. Where more prompt chaining is to be performed, operation 606 can return to operation 604, and otherwise process flow can move to 608, where process flow 600 ends.

FIG. 7 illustrates another example process flow 700 that can facilitate recommendation generation with user values, in accordance with an embodiment of this disclosure. In some examples, one or more embodiments of process flow 700 can be implemented by system architecture 100 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 500 of FIG. 5, process flow 600 of FIG. 6, process flow 800 of FIG. 8, process flow 900 of FIG. 9, process flow 1000 of FIG. 10, and/or process flow 1100 of FIG. 11.

Process flow 700 begins with 702, and moves to operation 704.

Operation 704 depicts receiving answer feedback data that is associated with the entity. That is, feedback can be provided about how helpful the answer produced through process flow 500 of FIG. 5 is.

After operation 704, process flow 700 moves to operation 706.

Operation 706 depicts updating the first retrieval-augmented generation system, the first large language model, the second retrieval-augmented generation system, the value maintained by the entity associated with the computing system, or the second large language model based on the answer feedback data. That is, a system that implements the present techniques can be updated based on the feedback. This can comprise updating a RAG, a LLM, and/or what the user's values are.

After operation 706, process flow 700 moves to 708, where process flow 700 ends.

FIG. 8 illustrates another example process flow 800 that can facilitate recommendation generation with user values, in accordance with an embodiment of this disclosure. In some examples, one or more embodiments of process flow 800 can be implemented by system architecture 100 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 500 of FIG. 5, process flow 600 of FIG. 6, process flow 700 of FIG. 7, process flow 900 of FIG. 9, process flow 1000 of FIG. 10, and/or process flow 1100 of FIG. 11.

Process flow 800 begins with 802, and moves to operation 804.

Operation 804 depicts sending an alert regarding operation of a computing system other than the system to a first retrieval-augmented generation system to produce a first prompt. In some examples, operation 804 can be implemented in a similar manner as operations 504-506 of FIG. 5.

After operation 804, process flow 800 moves to operation 806.

Operation 806 depicts inputting the first prompt to a first large language model to produce a first answer. In some examples, operation 806 can be implemented in a similar manner as operation 508 of FIG. 5.

After operation 806, process flow 800 moves to operation 808.

Operation 808 depicts sending the alert to a second retrieval-augmented generation system to produce a value, wherein the value indicates a principle that has merit to an entity that is associated with the computing system, and wherein the second retrieval-augmented generation system comprises the first retrieval-augmented generation system or another retrieval-augmented generation system. In some examples, operation 808 can be implemented in a similar manner as operation 510 of FIG. 5.

In some examples, operation 808 comprises identifying, by the second retrieval-augmented generation system, telemetry information that is associated with the computing system, and determining, by the second retrieval-augmented generation system, the value based on the telemetry information. That is, user values can be linked to a particular issue at hand by retrieving matched user value keywords and telemetry data from computers that is associated with the specific alert.

In some examples, the value comprises a value type, and at least one parameter applicable to the second retrieval-augmented generation system is modified based on the value type. In some examples, the value comprises a value type, and at least one parameter applicable to the second large language model is modified based on the value type. That is, there can be examples where each RAG can be specific to a particular user value type and for each prompt chaining iteration, and the LLM that is used can also be the best-fit model (or specialized) for the particular user value.

After operation 808, process flow 800 moves to operation 810.

Operation 810 depicts inputting the first answer, the value, and a second prompt to a second large language model to produce a second answer, wherein the second large language model comprises the first large language model or another large language model. In some examples, operation 810 can be implemented in a similar manner as operation 512 of FIG. 5.

After operation 810, process flow 800 moves to operation 812.

Operation 812 depicts inputting the second answer, information about the entity that is separate from the value, and a third prompt to a third large language model to produce a third answer, wherein the third large language model comprises the second large language model or another large language model. In some examples, operation 812 can be implemented in a similar manner as operation 514 of FIG. 5.

After operation 812, process flow 800 moves to operation 814.

Operation 814 depicts making the third answer accessible to a device associated with the entity. In some examples, operation 814 can be implemented in a similar manner as operation 516 of FIG. 5.

After operation 814, process flow 800 moves to 816, where process flow 800 ends.

Figure 9:
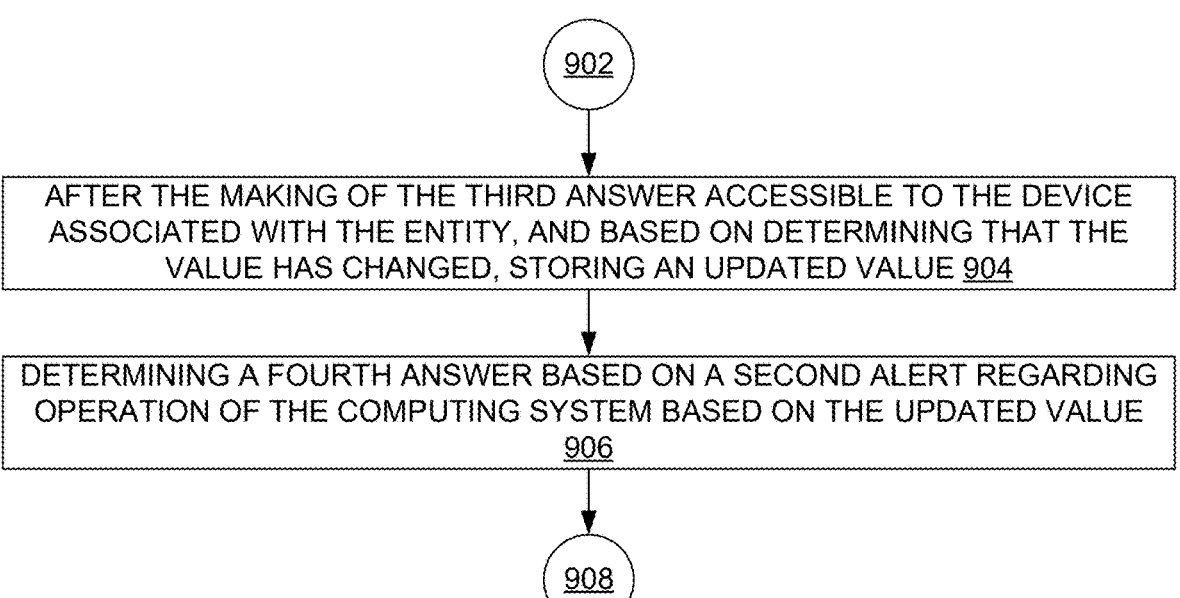
FIG. 9 illustrates another example process flow that can facilitate recommendation generation with user values, in accordance with an embodiment of this disclosure.

FIG. 9 illustrates another example process flow 900 that can facilitate recommendation generation with user values, in accordance with an embodiment of this disclosure. In some examples, one or more embodiments of process flow 900 can be implemented by system architecture 100 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 500 of FIG. 5, process flow 600 of FIG. 6, process flow 700 of FIG. 7, process flow 800 of FIG. 8, process flow 1000 of FIG. 10, and/or process flow 1100 of FIG. 11.

Process flow 900 begins with 902, and moves to operation 904.

In some examples where process flow 900 is implemented in conjunction with process flow 800 of FIG. 8, the alert is a first alert.

Operation 904 depicts, after the making of the third answer accessible to the device associated with the entity, and based on determining that the value has changed, storing an updated value. That is user values can change over time (which can be determined explicitly and/or implicitly).

After operation 904, process flow 900 moves to operation 906.

Operation 906 depicts determining a fourth answer based on a second alert regarding operation of the computing system based on the updated value. That is, as user values change over time, the present techniques can be updated, and recommendations can be made based on current user values.

After operation 906, process flow 900 moves to 908, where process flow 900 ends.

Figure 10:
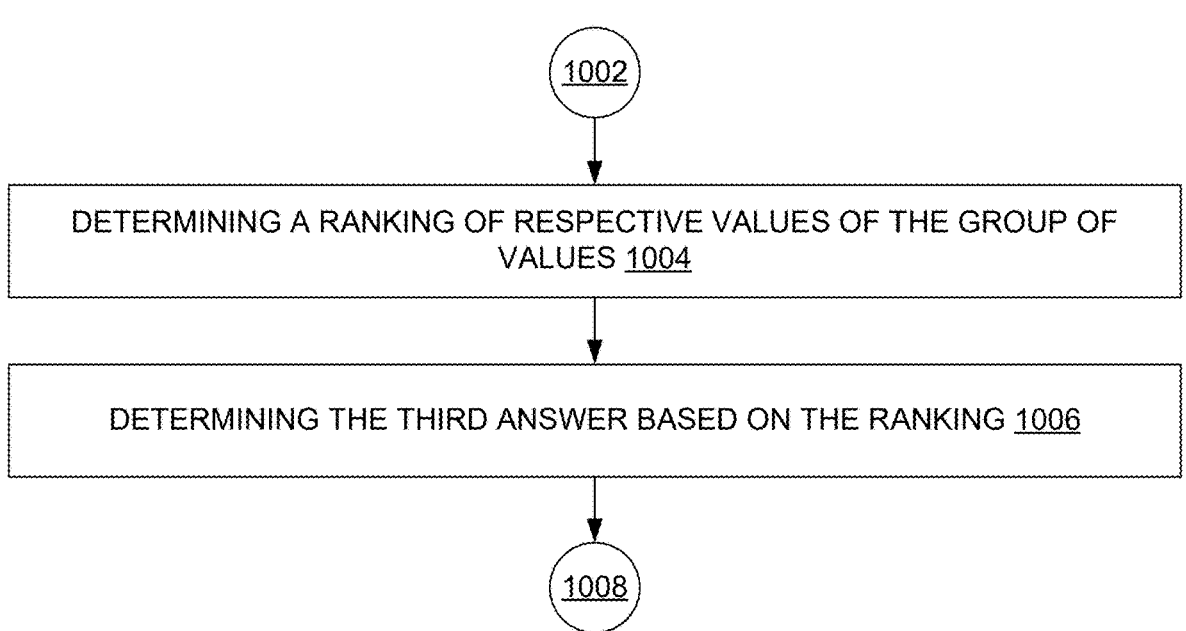
FIG. 10 illustrates another example process flow that can facilitate recommendation generation with user values, in accordance with an embodiment of this disclosure.

FIG. 10 illustrates another example process flow 1000 that can facilitate recommendation generation with user values, in accordance with an embodiment of this disclosure. In some examples, one or more embodiments of process flow 1000 can be implemented by system architecture 100 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 500 of FIG. 5, process flow 600 of FIG. 6, process flow 700 of FIG. 7, process flow 800 of FIG. 8, process flow 900 of FIG. 9, and/or process flow 1100 of FIG. 11.

Process flow 1000 begins with 1002, and moves to operation 1004.

In some examples where process flow 1000 is implemented in conjunction with process flow 800 of FIG. 8, a group of values comprises the value.

Operation 1004 depicts determining a ranking of respective values of the group of values. That is, a user can provide user input data to rank its user values.

After operation 1004, process flow 1000 moves to operation 1006.

Operation 1006 depicts determining the third answer based on the ranking. That is, the ranking of user values can be utilized in making a recommendation (e.g., to weight the applicability of the user's top user value more than the applicability of the user's third-ranked user value in making the recommendation).

After operation 1006, process flow 1000 moves to 1008, where process flow 1000 ends.

FIG. 11 illustrates another example process flow 1100 that can facilitate recommendation generation with user values, in accordance with an embodiment of this disclosure. In some examples, one or more embodiments of process flow 1100 can be implemented by system architecture 100 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 1100 begins with 1102, and moves to operation 1104.

Operation 1104 depicts communicating an alert regarding operation of a computing system other than the system to a first retrieval-augmented generation system resulting in obtaining a first prompt. In some examples, operation 1104 can be implemented in a similar manner as operations 504-506 of FIG. 5.

After operation 1104, process flow 1100 moves to operation 1106.

Operation 1106 depicts communicating the first prompt to a first large language model resulting in obtaining a first answer. In some examples, operation 1106 can be implemented in a similar manner as operation 508 of FIG. 5.

After operation 1106, process flow 1100 moves to operation 1108.

Operation 1108 depicts communicating the alert to a second retrieval-augmented generation system resulting in obtaining a value, wherein the value indicates a concept that has been specified to be desirable to an entity that is associated with the computing system, and wherein the second retrieval-augmented generation system comprises the first retrieval-augmented generation system or another retrieval-augmented generation system. In some examples, operation 1108 can be implemented in a similar manner as operation 510 of FIG. 5.

In some examples, the second retrieval-augmented generation system is the first retrieval-augmented generation system. In some examples, the first retrieval-augmented generation system and the second retrieval-augmented generation system are different retrieval-augmented generation systems. That is, there can be some examples where one RAG is used to implement the present techniques, and some examples where multiple RAGs are used to implement the present techniques.

In some examples, the value comprises a security value, a sustainability value, a resource efficiency value, a return on investment value, a cost value, or a capacity value. This can be similar to that which is depicted regarding FIG. 2.

After operation 1108, process flow 1100 moves to operation 1110.

Operation 1110 depicts communicating the first answer, the value, and a second prompt to a second large language model resulting in obtaining a second answer, wherein the second large language model comprises the first large language model or another large language model. In some examples, operation 1110 can be implemented in a similar manner as operation 512 of FIG. 5.

After operation 1110, process flow 1100 moves to operation 1112.

Operation 1112 depicts communicating the second answer, information about the entity that is separate from the value, and a third prompt to a third large language model resulting in obtaining a third answer, wherein the third large language model comprises the second large language model or another large language model. In some examples, operation 1112 can be implemented in a similar manner as operation 514 of FIG. 5.

In some examples, the second large language model is the first large language model, and wherein the third large language model is the first large language model. In some examples, the first large language model, the second large language model, and the third large language model are different large language models. That is, there can be some examples where one LLM is used to implement the present techniques, and some examples where multiple LLMs are used to implement the present techniques.

After operation 1112, process flow 1100 moves to operation 1114.

Operation 1114 depicts permitting the third answer to be accessed via a device associated with the entity. In some examples, operation 1114 can be implemented in a similar manner as operation 516 of FIG. 5.

After operation 1114, process flow 1100 moves to 1116, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of computer system 102, user computer 106, and or user system 114 of FIG. 1.

In some examples, computing environment 1200 can implement one or more embodiments of the process flows of FIGS. 5-11 to facilitate recommendation generation with user values.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 (containing disk 1222) can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/ storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1216 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

identifying an alert regarding operation of a computing system other than the system;

obtaining a first prompt as output from inputting the alert to a first retrieval-augmented generation system;

obtaining a first answer as output from inputting the first prompt to a first large language model;

obtaining a value maintained by an entity associated with the computing system as output from inputting the alert to a second retrieval-augmented generation system, wherein the second retrieval-augmented generation system comprises the first retrieval-augmented generation system or another retrieval-augmented generation system different from the first retrieval-augmented generation system;

obtaining a second answer as output from inputting the first answer, the value maintained by the entity associated with the computing system, and a second prompt to a second large language model, wherein the second large language model comprises the first large language model or another large language model different from the first large language model;

obtaining a third answer as output from inputting the second answer, information about the entity that is separate from the value, and a third prompt to a third large language model, wherein the third large language model comprises the second large language model or another large language model different from the second large language model; and enabling the third answer to be accessible via a device associated with the entity.

2. The system of claim 1, wherein the inputting of the alert to the second retrieval-augmented generation system results in output of a group of values that comprise the value, and wherein inputting the first answer, the value maintained by the entity associated with the computing system, and the second prompt to the second large language model comprises:

performing iterations of inputting the first answer, respective values of the values, and the second prompt to respective large language models of a group of at least one large language model that comprises the second large language model to obtain the second answer.

3. The system of claim 1, wherein the second retrieval-augmented generation system comprises a keywords vector data store of user values that comprise the value maintained by the entity associated with the computing system.

4. The system of claim 3, wherein the operations further comprise:

storing information from unstructured text data in the keywords vector data store.

5. The system of claim 3, wherein the operations further comprise:

storing information from structured text data, audio data, image data, video data, or interaction data in the keywords vector data store.

6. The system of claim 3, wherein the operations further comprise:

determining the value maintained by the entity associated with the computing system based on implicit information that is derived from actions taken by the entity, wherein the actions taken by the entity are separate from explicitly identifying the value.

7. The system of claim 3, wherein the second retrieval-augmented generation system comprises telemetry data that corresponds to the computing system.

8. The system of claim 1, wherein the operations further comprise:

receiving answer feedback data that is associated with the entity; and updating the first retrieval-augmented generation system, the first large language model, the second retrieval-augmented generation system, the value maintained by the entity associated with the computing system, or the second large language model based on the answer feedback data.

9. A method, comprising:

sending, by a system comprising at least one processor, an alert regarding operation of a computing system other than the system to a first retrieval-augmented generation system to produce a first prompt;

inputting, by the system, the first prompt to a first large language model to produce a first answer;

sending, by the system, the alert to a second retrieval-augmented generation system to produce a value, wherein the value indicates a principle that has merit to an entity that is associated with the computing system, and wherein the second retrieval-augmented generation system comprises the first retrieval-augmented generation system or another retrieval-augmented generation system;

inputting, by the system, the first answer, the value, and a second prompt to a second large language model to produce a second answer, wherein the second large language model comprises the first large language model or another large language model;

inputting, by the system, the second answer, information about the entity that is separate from the value, and a third prompt to a third large language model to produce a third answer, wherein the third large language model comprises the second large language model or another large language model; and making, by the system, the third answer accessible to a device associated with the entity.

10. The method of claim 9, wherein the alert is a first alert, and further comprising:

after the making of the third answer accessible to the device associated with the entity, and based on determining that the value has changed, storing, by the system, an updated value; and determining, by the system, a fourth answer based on a second alert regarding operation of the computing system based on the updated value.

11. The method of claim 9, wherein a group of values comprises the value, and further comprising:

determining, by the system, a ranking of respective values of the group of values; and wherein the third answer is determined based on the ranking.

12. The method of claim 9, further comprising:

identifying, by the second retrieval-augmented generation system, telemetry information that is associated with the computing system; and determining, by the second retrieval-augmented generation system, the value based on the telemetry information.

13. The method of claim 9, wherein the value comprises a value type, and wherein at least one parameter applicable to the second retrieval-augmented generation system is modified based on the value type.

14. The method of claim 9, wherein the value comprises a value type, and wherein at least one parameter applicable to the second large language model is modified based on the value type.

15. A non-transitory computer-readable medium comprising instructions that, in response to execution, cause a system comprising at least one processor to perform operations, comprising:

communicating an alert regarding operation of a computing system other than the system to a first retrieval-augmented generation system resulting in obtaining a first prompt;

communicating the first prompt to a first large language model resulting in obtaining a first answer;

communicating the alert to a second retrieval-augmented generation system resulting in obtaining a value, wherein the value indicates a concept that has been specified to be desirable to an entity that is associated with the computing system, and wherein the second retrieval-augmented generation system comprises the first retrieval-augmented generation system or another retrieval-augmented generation system;

communicating the first answer, the value, and a second prompt to a second large language model resulting in obtaining a second answer, wherein the second large language model comprises the first large language model or another large language model;

communicating the second answer, information about the entity that is separate from the value, and a third prompt to a third large language model resulting in obtaining a third answer, wherein the third large language model comprises the second large language model or another large language model; and permitting the third answer to be accessed via a device associated with the entity.

16. The non-transitory computer-readable medium of claim 15, wherein the value comprises a security value, a sustainability value, a resource efficiency value, a return on investment value, a cost value, or a capacity value.

17. The non-transitory computer-readable medium of claim 15, wherein the second large language model is the first large language model, and wherein the third large language model is the first large language model.

18. The non-transitory computer-readable medium of claim 15, wherein the first large language model, the second large language model, and the third large language model are different large language models.

19. The non-transitory computer-readable medium of claim 15, wherein the second retrieval-augmented generation system is the first retrieval-augmented generation system.

20. The non-transitory computer-readable medium of claim 15, wherein the first retrieval-augmented generation system and the second retrieval-augmented generation system are different retrieval-augmented generation systems.

* * * * *